July 4, 1933.   H. JANSSEN   1,916,221
AIRTIGHT MEAT COOKING CONTAINER AND PROCESSOR
Filed April 14, 1931
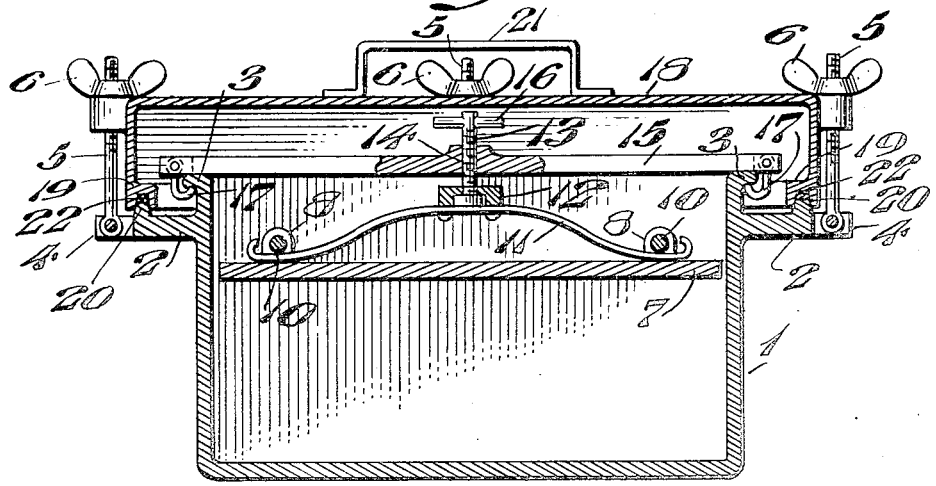
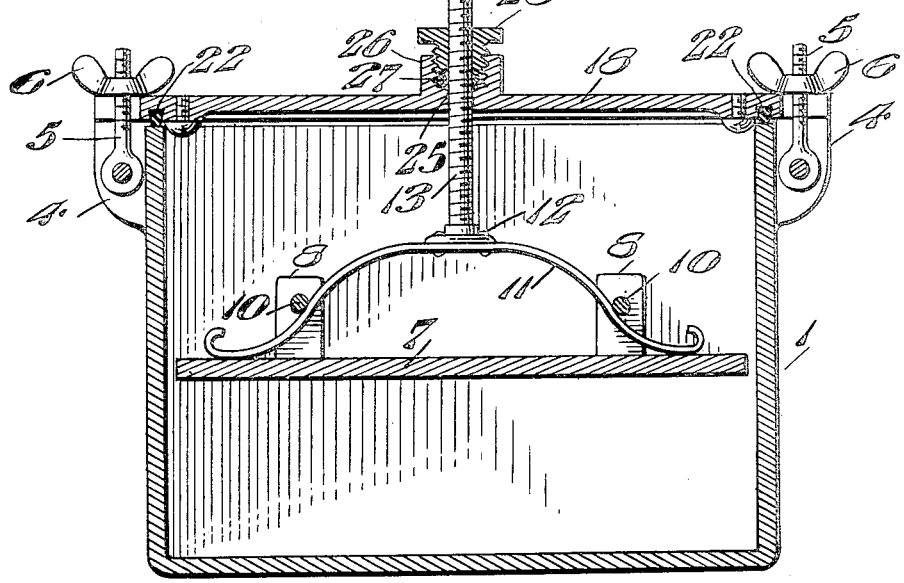
INVENTOR.
HENRY JANSSEN,
BY Louis Necho
ATTORNEY.

Patented July 4, 1933

1,916,221

UNITED STATES PATENT OFFICE

HENRY JANSSEN, OF PHILADELPHIA, PENNSYLVANIA, ASSIGNOR OF ONE-HALF TO GUSTAVE KUHN, OF PHILADELPHIA, PENNSYLVANIA

AIRTIGHT MEAT COOKING CONTAINER AND PROCESSOR

Application filed April 14, 1931. Serial No. 529,967.

This invention relates to an air tight cooker or processor of the type generally employed in cooking or processing meats.

This invention further relates to an air tight cooker or processor whereby the meat or other material being processed or cooked is suitably shaped or formed and whereby the cooking is accomplished in an air tight chamber, thereby preventing the escape of the flavor or aroma of the meat, and thus producing a more nutritious and delicious product.

This invention further relates to a cooker or processor which is completely and thoroughly air tight and which involves minimum manipulation during use and which is composed of an extremely simplified and practicable structure.

This invention further relates to a cooker or processor which is provided with means to supply constant predetermined pressure to the meat or other material being cooked or processed, so that any desired shape or contour may be produced.

This invention further relates to an air tight meat cooking container whereby the meat is cooked or processed in its own juice and without the addition of steam or water.

The present application is a continuation in part of my previous applications #509,055 filed January 16th, 1930 and #494,853 filed November 11th, 1930, now Patent No. 1,848,729, dated March 8, 1932, in which co-pending applications I have described and claimed an air tight meat cooking container, which however, was not sufficiently illustrated in the drawings of said applications since the structure in said drawings lacked specific means for rendering the device absolutely air tight. In the present application I have illustrated one of the forms of my invention shown in each of my applications above referred to, to which I have added a gasket and a stuffing box to render my device effectively and permanently air tight.

To the above ends this invention consists of a casing or container adapted to hold the meat to be cooked, a plunger adapted to move vertically within said container, a spring adapted to exert pressure upon said plunger, means for compressing said spring, a lid for said container, means for compressing said spring, a lid for said container, means for clamping said lid in position, and means for forming an air tight connection between said lid and said container.

Ths invention further consists of means for rendering all joints and connections of detachable parts air tight.

This invention still further consists of various other features of structure and advantage all as hereinafter described and claimed in connection with the accompanying drawing, in which:—

Fig. 1 is a vertical sectional view of an air tight meat cooking container and processor embodying my invention.

Fig. 2 represents a view similar to Fig. 1 showing a modified construction.

Referring to the drawing in which like reference characters indicate like parts, and referring particularly to Fig. 1, it will be seen that the novel cooker and processor forming the subject matter of this invention comprises the container or casing 1 which may be square, rectangular or any other desired shape, and which is provided with the outwardly extending lower and upper flanges 2 and 3. The lower flange 2 is provided with the lip or extension 4 in which is pivoted the threaded bolt 5 which carries the wing nuts 6 hereinafter further referred to. Within said container 1 is disposed the plunger 7 which is of a slightly smaller size than the size of the casing, and which is used to compress the meat contained in the cooker or processor. The plunger 7 is provided with the ears or lugs 8 which carry the horizontal bolts 10 which engage the deflected ends of the spring 11 to retain the latter in position as seen in Fig. 1. The spring 11 may be of any desired size or contour and is secured at the center part thereof to the block 12 which is engaged by the head of the threaded bolt 13 which extends upwardly through the threaded hub 14 in the bar 15. The threaded bolt 13 is provided with the upper cross bar 16 whereby the bolt is manipulated to adjust the compression of the spring 11 in the usual manner. The bar 15 is adapted to straddle the top of the container 1 and to rest upon the upper flanges 3, the ends of said bar being provided with the pivoted hooks 17, which engage the under side of the flange 3 to retain the bar 15 in position. 18 designates a lid or cover provided with the forked or grooved bottom annular bead 19 which is adapted to straddle and engage the upwardly extending rim or bead 20 of the lower flange 2 of the container 1, as will be best understood from Fig. 1. The cover 18 is provided with a suitable handle 21 and is clamped in position by the wing nuts 6 engaging the pivoted threaded bolts 5 hereinbefore referred to and the function of which will be best understood from Fig. 1.

In order to insure a perfectly air tight connection intermediate the grooved annular bead 19 and the bead 20 on the flange 2 of the container 1, I utilize a suitable basket 22 which when tightly compressed by the wing nut 6 will produce a perfect seal.

The operation of this form of the invention is as follows:—the meat or other material to be cooked and processed, is placed within the container 1 with the required ingredients and the plunger 7 is pressed downward within the casing 1 by means of the sliding flat spring 11 which is manipulated and adjusted by the bolt 13 mounted in the cross bar 15. The lid 18 is then clamped in position by means of the wing nuts 6, with the lower forked or grooved bead 19 thereof engaging the upwardly extending rim or bead 20 formed on the periphery of the lower flange 2 of the container 1. The joint formed between the bottom grooved or forked bead 19 of the cover 18 and the bead 20 of the flange 2 is air tight and by using the spring 11, which tends to keep the meat properly compressed regardless of its expansion or contraction during the process of cooking, it will not be necessary to remove the lid 18 until the cooking or processing operation has been completed. This prevents the escape of the aroma and flavor of the meat being cooked and produces a delicious and nutritious product. Furthermore, the air tight method of cooking or processing prevents loss due to shrinkage which invariably takes place when the cooker or processor is not air tight.

In Fig. 2 I have shown a modified form of my invention wherein the threaded stem 13 which is adapted to actuate the spring 11 projects thru the top 18 of the container 1 and is provided with a wheel or nob 24 whereby the stem 13 is turned. While it is possible to machine the stem 13 and the hole 25 in the top 18 of the casing 1 and to make these parts from hard metal to produce an air tight conection, I prefer to utilize any desired stuffing box 26 which contains any suitable packing 27 which is compressed by the nut 28 around the stem 13 in the usual manner to produce an air tight joint which in addition to being 100% effective is also relatively speaking of permanent duration.

The operation of this device is identical with that described in connection with Fig. 1 and need not be described in further detail.

Having thus described my invention what I claim as new and desire to secure by Letters Patent, is:—

A meat cooker and processor comprising a container having a lower horizontal flange below, and an upper horizontal flange on the rim thereof, a cross bar resting on the top of said container, means on the end of said bar to engage said upper flange, a threaded boss in said bar, a threaded bolt engaging said boss, a spring carried by the lower end of said bolt, a plunger slidably engaging the ends of said spring and adapted to move within said container, a lid for said container, including a pendant flange adapted to rest on and engage said lower flange in an air tight manner, and means for detachably but firmly clamping said lid.

HENRY JANSSEN.